US012126986B2

(12) United States Patent
Borss et al.

(10) Patent No.: US 12,126,986 B2
(45) Date of Patent: Oct. 22, 2024

(54) APPARATUS AND METHOD FOR RENDERING A SOUND SCENE COMPRISING DISCRETIZED CURVED SURFACES

(71) Applicant: Fraunhofer-Gesellschaft zur Foerderung der angewandten Forschung e. V., Munich (DE)

(72) Inventors: Christian Borss, Erlangen (DE); Frank Wefers, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 128 days.

(21) Appl. No.: 17/940,876

(22) Filed: Sep. 8, 2022

(65) Prior Publication Data

US 2023/0007429 A1 Jan. 5, 2023

Related U.S. Application Data

(63) Continuation of application No. PCT/EP2021/056362, filed on Mar. 12, 2021.

(30) Foreign Application Priority Data

Mar. 13, 2020 (EP) .................................... 20163151

(51) Int. Cl.
*H04S 7/00* (2006.01)

(52) U.S. Cl.
CPC ........... *H04S 7/303* (2013.01); *H04S 2400/11* (2013.01)

(58) Field of Classification Search
CPC ............................ H04S 7/303; H04S 2400/11
(Continued)

(56) References Cited

U.S. PATENT DOCUMENTS 8,437,868 B2 5/2013 Spille et al.
8,488,796 B2 7/2013 Jot et al.
(Continued)

FOREIGN PATENT DOCUMENTS

EP 3090573 A1 11/2016
EP 3220669 B1 12/2018
(Continued)

OTHER PUBLICATIONS

Allen, John B, et al., "Image method for efficiently simulating small-room acoustics", The Journal of the Acoustical Society of America, (19790000), vol. 65, No. 4,pp. 943-950, 1979, pp. 943-950.

(Continued)

*Primary Examiner* — William A Jerez Lora
(74) *Attorney, Agent, or Firm* — Perkins Coie LLP; Michael A. Glenn

(57) ABSTRACT

An apparatus for rendering a sound scene having reflection objects and a sound source at a sound source position, includes: a geometry data provider for providing an analysis of the reflection objects of the sound scene to determine a reflection object represented by a first polygon and a second adjacent polygon having associated a first image source position for the first polygon and a second image source position for the second polygon, wherein the first and second image source positions result in a sequence including a first visible zone related to the first image source position, an invisible zone and a second visible zone related to the second image source position; an image source position generator for generating an additional image source position such that the additional image source position is placed between the first image source position and the second image source position; and a sound renderer for rendering the sound source at the sound source position and, addition- (Continued)

ally for rendering the sound source at the first image source position, when a listener position is located within the first visible zone, for rendering the sound source at the additional image source position, when the listener position is located within the invisible zone, or for rendering the sound source at the second image source position, when the listener position is located within the second visible zone.

19 Claims, 12 Drawing Sheets

(58) Field of Classification Search
USPC .......................... 381/1, 27, 56, 58, 303, 310
See application file for complete search history.

(56) References Cited

U.S. PATENT DOCUMENTS

| | | | | |
|---|---|---|---|---|
| 9,564,138 | B2 | 2/2017 | Oh et al. | |
| 9,711,126 | B2 | 7/2017 | Mehra et al. | |
| 10,075,800 | B2 | 9/2018 | Sladeczek et al. | |
| 2006/0029243 | A1* | 2/2006 | Gerrard | H04S 7/30 381/310 |
| 2012/0249556 | A1 | 10/2012 | Chandak et al. | |
| 2013/0259115 | A1 | 10/2013 | Stieglitz | |
| 2014/0161268 | A1 | 6/2014 | Antani et al. | |
| 2015/0365777 | A1 | 12/2015 | Kim | |
| 2015/0378019 | A1 | 12/2015 | Schissler et al. | |
| 2017/0208417 | A1* | 7/2017 | Thakur | H04S 7/306 |
| 2017/0324792 | A1 | 11/2017 | Estrop et al. | |
| 2017/0325045 | A1 | 11/2017 | Baek et al. | |
| 2018/0098172 | A1 | 4/2018 | Family et al. | |
| 2018/0295460 | A1 | 10/2018 | Chon et al. | |
| 2018/0359591 | A1* | 12/2018 | Bygrave | H04S 7/303 |
| 2019/0013031 | A1 | 1/2019 | Disch et al. | |
| 2019/0020968 | A1 | 1/2019 | Suenaga et al. | |
| 2020/0142851 | A1 | 5/2020 | Catiller | |
| 2023/0007426 | A1* | 1/2023 | Koppens | G10K 15/12 |

FOREIGN PATENT DOCUMENTS

| | | | |
|---|---|---|---|
| JP | 2003061200 | A | 2/2003 |
| JP | 2017530413 | A | 10/2017 |
| JP | 2019506695 | A | 3/2019 |
| KR | 20170125660 | A | 11/2017 |
| RU | 12523215 | C2 | 7/2014 |
| RU | 2540774 | C2 | 2/2015 |
| RU | 2602346 | C2 | 11/2016 |
| RU | 2646375 | C2 | 3/2018 |
| RU | 2656986 | C1 | 6/2018 |
| RU | 2698775 | C1 | 8/2019 |
| WO | 2010017967 | A1 | 2/2010 |
| WO | 2014036085 | A1 | 3/2014 |
| WO | 2015102920 | A1 | 7/2015 |
| WO | 2015156654 | A1 | 10/2015 |
| WO | 2016054186 | A1 | 4/2016 |
| WO | 2017140949 | A1 | 8/2017 |

OTHER PUBLICATIONS

Funkhouser, Thomas, et al., "A beam tracing approach to acoustic modeling for interactive virtual environments", Proc. of ACM SIGGRAPH, (19980000), doi:10.1145/280814.280818, pp. 21-32, XP058331794, pp. 21-32.

Krokstad, A., et al., "Calculating the acoustical room response by the use of a ray tracing technique", Journal of Sound and Vibration 8.1 (1968): 118-125, pp. 118-125.

Mehra, Ravish, et al., "Source and listener directivity for interactive wave-based sound propagation", IEEE Transactions on Visualization and Computer Graphics, (20140000), vol. 20, No. 4, doi: 10.1109/TVCG.2014.38, pp. 495-503, XP011543571, pp. 495-503.

Mehra, Ravish, et al., "Wave-based sound propagation in large open scenes using an equivalent source formulation", ACM Trans. on Graphics, (20130000), vol. 32, No. 2,pp. 1-13, pp. 1-13.

Noe, Nicolas, et al., "[Uploaded in 2 parts] Application de l'acoustique géométrique à la simulation de la réflexion et de la diffraction par des surfaces courbes", 10ÈME Congrès Françaisd'acoustique, (20100416), pp. 1-7, XP055810825 [A] 1-19 * the whole document, 4 pp.

Noe, Nicolas, et al., "A general ray-tracing solution to reflection on curved surfaces and diffraction by their bounding edges", Theoretical and Computationalacoustics 2009, (20090911), pp. 225-234, XP055810798 [A] 1-19 * sections 2("Previous work"), 3.3 ("Tesselated geometry"), 3.4 ("Acoustic computations"); figures1(b), 6, pp. 225-234.

Pharr, Matt, et al., "[Uploaded in 9 parts] Physically Based Rendering", Morgan Kaufmann Publishers Inc. San Francisco, USA, 51 pp.

Raghuvanshi, Nikunj, et al., "Parametric directional coding for precomputed sound propagation", ACM Trans. on Graphics, (20180000), vol. 37, No. 4, pp. 1-14, pp. 1-14.

Savioja, Svensson, et al., "Overview of geometrical room acoustic modelling techniques", The Journal of the Acoustical Society of America 138.2 (2015): 708-730, pp. 708-730.

Schissler, Carl, et al., "High-order diffraction and diffuse reflections for interactive sound propagation in large environments", ACM Transactions on Graphics, ACM, NY,US, (20140727), vol. 33, No. 4, doi: 10.1145/2601097.2601216, ISSN 0730-0301, pp. 1-2, XP058516463 [A] 1-20, pp. 1-12.

Schröeder, "Physically Based Real-Time Auralization of Interactive Virtual Environments", XP055593422, Berlin, Retrieved from the Internet: URL:http://publications.rwth-aachen.de/record/50580/files/3875.pdf [retrieved on Jun. 3, 2019] chapter 5.2.3, Feb. 4, 2011, pp. 1-4.7, 8,19, 20.

Svensson, U. Peter, et al., "An analytic secondary source model of edge diffraction impulse responses", Acoustical Society of America Journal, (19990000), vol. 106, doi:10.1121/1.428071, pp. 2331-2344, XP012001263, 1999, pp. 2331-2344.

Taylor, Micah, et al., "Guided multiview ray tracing for fast auralization", IEEE Transactions on Visualization and Computer Graphics, (20120000), vol. 18, pp. 1797-1810, pp. 1797-1810.

Taylor, Micah T, et al., "Resound: interactive sound rendering for dynamic virtual environments", Proc. of the seventeen ACM international conference on Multimedia, (20090000), pp. 271-280, 2009, pp. 271-280.

Tsingos, Nicolas, et al., "Modeling acoustics in virtual environments using the uniform theory of diffraction", Proc. of the SIGGRAPH, (20010000), doi:10.1145/383259.383323, pp. 545-552, XP058253479, pp. 545-552.

Tsingos, Nicolas, et al., "Perceptual audio rendering of complex virtual environments", ACM Transactions on Graphics (TOG) 23.3 (2004): 249-258, pp. 249-258.

Ucdavis, "Head-Related Transfer Functions", www.ece.ucdavis.edu-cipic-spatia-sound_Head-Related, 2019, 6 pp.

Vorländer, Michael, "[Uploaded in 3 parts] Auralization: fundamentals of acoustics, modelling, simulation, algorithms and acoustic virtual reality", Springer Science & Business Media, 2007, 170 pp.

Wenzel, Elizabeth M, et al., "Sound Lab: A real-time, software-based system for the study of spatial hearing", Audio Engineering Society Convention 108. Audio Engineering Society, 2000, 2000, 27 pp.

Yeh, Hengchin, et al., "Wave-ray coupling for interactive sound propagation in large complex scenes", ACM Trans. Graph., (20130000), vol. 32, No. 6, doi:10.1145/2508363.2508420, pp. 1-11, XP058033914, pp. 1-11.

Borish, J., "Extension of the image model to arbitrary polyhedra", The Journal of the Acoustical Society of America 75.6 (1984): 1827-1836, pp. 1827-1836.

Kouyoumjian, et al., "A uniform geometrical theory of diffraction for an edge in a perfectly conducting surface", Proc. of the IEEE, (19740000), vol. 62, No. 11, pp. 1448-1461, XP000605077, 1974, pp. 1448-1461.

(56) References Cited

OTHER PUBLICATIONS

Mechel, F. P, "Improved mirror source method in room acoustics", Journal of sound and vibration 256.5 (2002): 873-940, 2002, pp. 873-940.
Savioja, Lauri, et al., "Interpolated rectangular 3-D digital waveguide mesh algorithms with frequency warping", IEEE Trans. Speech Audio Process., (20030000), vol. 11, No. 6, doi:10.1109/TSA.2003.818028, pp. 783-790, XP011104550, pp. 783-790.
Stephenson, U. M, "Analytical derivation of a formula for the reduction of computation time by the voxel crossing technique used in room acoustical simulation", Applied Acoustics 67.10 (2006): 959-981, 2006, pp. 959-981.
Vorländer, Michael, "Simulation of the transient and steady-state sound propagation in rooms using a new combined raytracing/image-source algorithm", The Journal of the Acoustical Society of America, (19890000), vol. 86, No. 1, pp. 172-178, pp. 172-178.
Potard, Guillaume, et al., "Decorrelation Techniques for the Rendering of Apparent Sound Source Width in 3D Audio Displays", Proc. of the 7th Int'l Conference on Digital Audio Effects (DAFx'04), Naples, Italy, pp. 280-284.
Schissler, Carl, et al., "Efficient HRTF-based Spatial Audio for Area and Volumetric Sources", IEEE Transactions on Visualization and Computer Graphics, vol. 22, No. 4, 2016, pp. 1356-1366.

* cited by examiner

APPARATUS AND METHOD FOR RENDERING A SOUND SCENE COMPRISING DISCRETIZED CURVED SURFACES

CROSS-REFERENCES TO RELATED APPLICATIONS

This application is a continuation of copending International Application No. PCT/EP2021/056362, filed Mar. 12, 2021, which is incorporated herein by reference in its entirety, and additionally claims priority from European Applications No. EP 20 163 151.2, filed Mar. 13, 2020, which is which incorporated herein by reference in its entirety.

BACKGROUND OF THE INVENTION

The present invention relates to audio processing and, particularly, to audio signal processing for rendering sound scenes comprising reflections modeled by image sources in the field of Geometrical Acoustics.

Geometrical Acoustics are applied in auralization, i.e., real-time and offline audio rendering of auditory scenes and environments [1, 2]. This includes Virtual Reality (VR) and Augmented Reality (AR) systems like the MPEG-I 6-DoF audio renderer. For rendering complex audio scenes with six degrees of freedom (DoF), the field of Geometrical Acoustics is applied, where the propagation of sound data is modeled with models known from optics such as ray-tracing. Particularly, the reflections at walls are modeled based on models derived from optics, in which the angle of incidence of a ray that is reflected at the wall results in a reflection angle being equal to the angle of incidence.

Real-time auralization systems, like the audio renderer in a Virtual Reality (VR) or Augmented Reality (AR) system, usually render early specular reflections based on geometry data of the reflective environment [1,2]. A Geometrical Acoustics method like ray-tracing [3] or the image source method [4] is then used to find valid propagation paths of the reflected sound. These methods are valid, if the reflecting planar surfaces are large compared to the wave length of incident sound [1]. Furthermore, the distance of the reflection point on the surface to the boundaries of the reflecting surface also has to be large compared to the wave length of incident sound.

If the geometry data approximates curved surfaces by triangles or rectangles, the classic Geometrical Acoustics methods are no longer valid and artifacts become audible. The resulting "disco ball effect" is illustrated in FIG. 6. For a moving listener or a moving sound source the visibility of the image source will alternate between visible and invisible, resulting in a permanently switching localization, timbre, and loudness.

If a classic image source model is used, there is usually no mitigation technique applied for the given problem [5]. If diffuse reflections are modeled in addition to specular reflections, this will further reduce the effect, but cannot solve it. Summarizing, no solution for this problem is described in the state-of-the-art.

It is an object of the present invention to provide a concept for mitigating the disco ball effect in Geometrical Acoustics or to provide a concept of rendering a sound scene that provides an improved audio quality.

SUMMARY

According to an embodiment, an apparatus for rendering a sound scene having reflection objects and a sound source at a sound source position may have: a geometry data provider for providing an analysis of the reflection objects of the sound scene to determine a reflection object represented by a first polygon and a second adjacent polygon having associated a first image source position for the first polygon and a second image source position for the second polygon, wherein the first and second image source positions result in a sequence having a first visible zone related to the first image source position, an invisible zone and a second visible zone related to the second image source position; an image source position generator for generating an additional image source position such that the additional image source position is placed between the first image source position and the second image source position; and a sound renderer for rendering the sound source at the sound source position and, additionally for rendering the sound source at the first image source position, when a listener position is located within the first visible zone, for rendering the sound source at the additional image source position, when the listener position is located within the invisible zone, or for rendering the sound source at the second image source position, when the listener position is located within the second visible zone.

According to an embodiment, a method of rendering a sound scene having reflection objects and a sound source at a sound source position may have the steps of. providing an analysis of the reflection objects of the sound scene to determine a reflection object represented by a first polygon and a second adjacent polygon having associated a first image source position for the first polygon and a second image source position for the second polygon, wherein the first and second image source positions result in a sequence having a first visible zone related to the first image source position, an invisible zone and a second visible zone related to the second image source position; generating an additional image source position such that the additional image source position is placed between the first image source position and the second image source position; and rendering the sound source at the sound source position and, additionally rendering the sound source at the first image source position, when a listener position is located within the first visible zone, rendering the sound source at the additional image source position, when the listener position is located within the invisible zone, or rendering the sound source at the second image source position, when the listener position is located within the second visible zone.

Another embodiment may have a non-transitory digital storage medium having a computer program stored thereon to perform the method of rendering a sound scene having reflection objects and a sound source at a sound source position, the method having the steps of: providing an analysis of the reflection objects of the sound scene to determine a reflection object represented by a first polygon and a second adjacent polygon having associated a first image source position for the first polygon and a second image source position for the second polygon, wherein the first and second image source positions result in a sequence having a first visible zone related to the first image source position, an invisible zone and a second visible zone related to the second image source position; generating an additional image source position such that the additional image source position is placed between the first image source position and the second image source position; and rendering the sound source at the sound source position and, additionally rendering the sound source at the first image source position, when a listener position is located within the first visible zone, rendering the sound source at the additional image source position, when the listener position is located within the invisible zone, or rendering the sound source at the second image source position, when the listener position is located within the second visible zone, when said computer program is run by a computer.

The present invention is based on the finding that the problems associated with the so-called disco ball effect in Geometric Acoustics can be addressed by performing an analysis of reflecting geometric objects in a sound scene in order to determine whether a reflecting geometric object results in visible zones and invisible zones. For an invisible zone, an image source position generator generates an additional image source position so that the additional image source positon is placed between two image source positions being associated with the neighboring visible zones. Furthermore, a sound renderer is configured to render the sound source at the sound source position in order to obtain an audio impression of the direct path and to additionally rendering the sound source at an image source position or an additional image source position depending on whether the listener position is located within a visible zone or an invisible zone. By this procedure, the disco ball effect in Geometrical Acoustics is mitigated. This procedure can be applied in auralization such as real-time and offline audio rendering auditory scenes and environments.

In embodiments, the present invention provides several components, where one component comprises a geometry data provider or a geometry pre-processor which detects curved surfaces such as "round edges" or "round corners". Furthermore, the embodiments refer to the image source position generator that applies an extended image source model for the identified curved surfaces, i.e., the "round edges" or "round corners".

Particularly, an edge is a boundary line of a surface, and a corner is the point where two or more converging lines meet. A round edge is a boundary line between two flat surfaces that approximate a rounded continuous surfaces by means of triangles or polygons. A round corner or rounded corner is a point that is a common vertex of several flat surfaces that approximate a rounded continuous surfaces by means of triangles or polygons. Particularly, when a Virtual Reality scene, for example, comprises an advertising pillar or advertising column, this advertising pillar or advertising column can be approximated by polygon-shaped planes such as triangle or other polygon-shaped planes, and due to the fact that the polygon planes are not infinitesimally small, invisible zones between visible zones can occur.

Typically, there will exist intentional edges or corners, i.e., objects in the audio scene that are to be acoustically represented as they are, and any effects that occur due to the acoustical processing are intended. However, rounded or round corners or edges are geometric objects in the audio scene that result in the disco ball artefact or, stated in other words, that result in invisible zones that degrade the audio quality when a listener moves with respect to a fixed source from a visible zone into an invisible zone or when a fixed listener listens to a moving source that results in bringing the user into an invisible zone and then a visible zone and then an invisible zone. Or, alternatively, when both, the listener and the source move, it can be that a listener is at one point in time within a visible zone and at another point in time in an invisible zone that is only due because of the applied Geometrical Acoustics model, but has nothing to do with the real-world acoustical scene that is to be approximated as far as possible by the apparatus for rendering the sound scene or the corresponding method.

The present invention is advantageous since it generates high quality audio reflections on spheres and cylinders or other curved surfaces. The extended image source model is particularly useful for primitives such as polygons approximating cylinders, spheres or other curved surfaces. Above all, the present invention results in a quickly converging iterative algorithm for computing first order reflections particularly relying on the image source tools for modeling reflections. Advantageously, a particular frequency-selective equalizer is applied in addition to a material equalizer that accounts for the frequency-selective reflection characteristic that typically is a high-pass filter that depends on a reflector diameter, for example. Furthermore, the distance attenuation, the propagation time and the frequency-selective wall absorption or wall reflection is taken into account in embodiments. Advantageously, the inventive application of an additional image source position generation "enlightens" the dark or invisible zones. An additional reflection model for rounded edges and corners relies on this generation of additional image sources in addition to the classical image sources associated with the polygonal planes. Advantageously, a continuous extrapolation of image sources into the "dark" or invisible zones is performed advantageously using the technology of frustum tracing for the purpose of calculating first order reflections. In other embodiments, the technology can also be extended to second or higher order reflection processing. However, performing the present invention for applying the calculation of first order reflections already results in high audio quality and it has been found out that performing higher order reflection calculation, although being possible, will not always justify the additional processing requirements in view of the additionally gained audio quality. The present invention provides a robust, relatively easy to implement but nevertheless powerful tool for modeling reflections in complex sound scenes having problematic or specific reflection objects that would suffer from invisible zones without the application of the present invention.

BRIEF DESCRIPTION OF THE DRAWINGS

Embodiments of the present invention will be detailed subsequently referring to the appended drawings, in which:

FIG. 10.

DETAILED DESCRIPTION OF THE INVENTION

Figure 1:
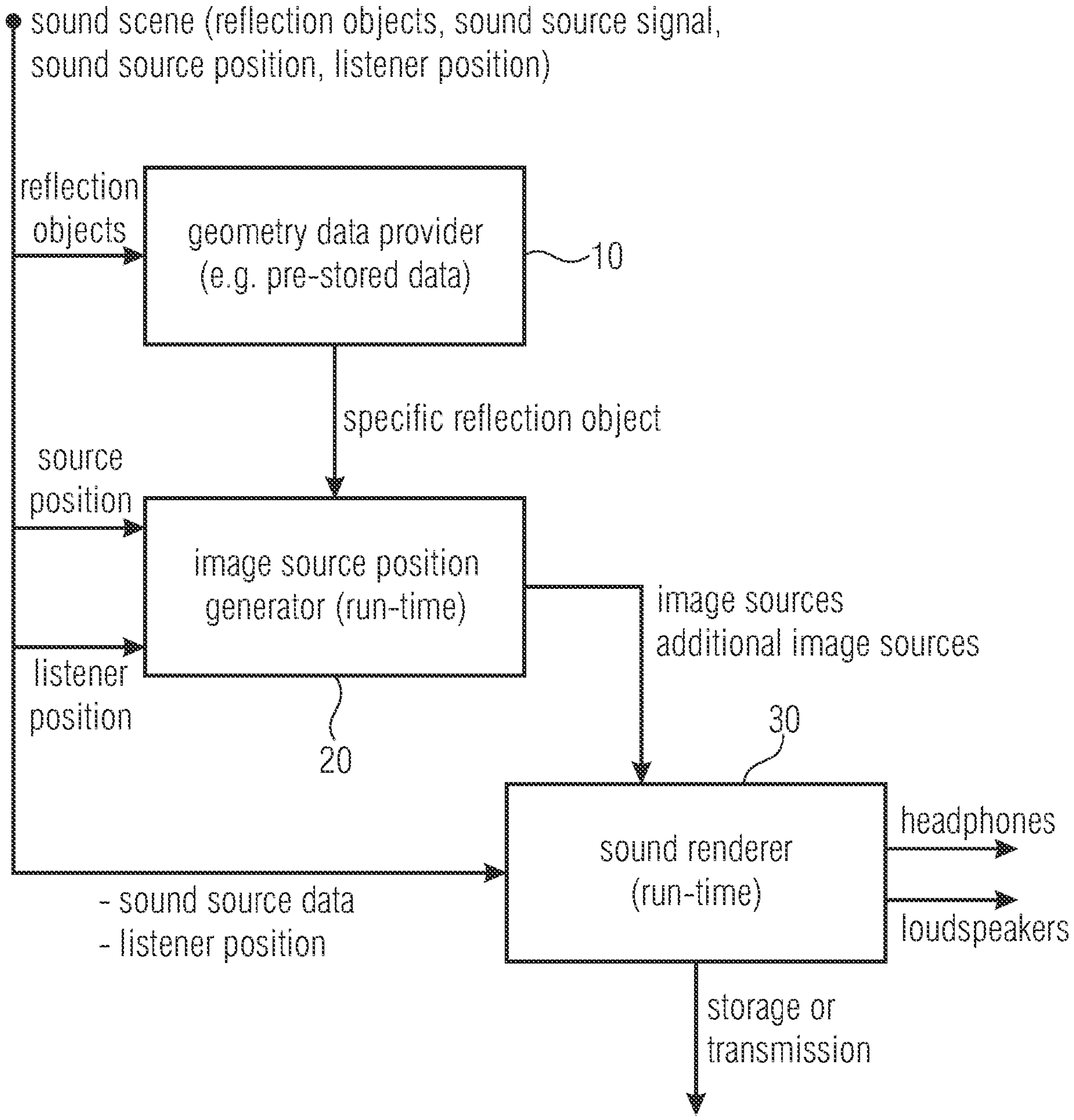
FIG. 1 illustrates a block diagram of an embodiment of the apparatus for rendering a sound scene.

FIG. 1 illustrates an apparatus for rendering a sound scene having reflection objects and a sound source at a sound source position. In particular, the sound source is represented by a sound source signal that can, for example, be a mono or a stereo signal and, in the sound scene, the sound source signal is emitted at the sound source position. Furthermore, the sound scene typically has an information on a listener position, where the listener position comprises, on the one hand, a listener location within a, for example, three-dimensional space or where the listener position incurs, on the other hand, a certain orientation of the head of the listener within a three-dimensional space. A listener can be positioned, with respect to her or his ears, at a certain location in the three-dimensional space resulting in three dimensions, and the listener can also turn his head around three different axes resulting in additional three dimensions so that a six degree of freedom's Virtual Reality or Augmented Reality situation can be processed. The apparatus for rendering a sound scene comprises a geometry data provider 10, an image source position generator 20 and a sound renderer 30 in an embodiment. The geometry data provider can be implemented as a preprocessor for performing certain operations before the actual runtime or the geometry data provider can be implemented as a geometry processor doing its operation also at runtime. However, performing the calculations of the geometry data provider in advance, i.e., before the actual Virtual Reality or Augmented Reality rendering will free a processing platform from the corresponding geometry preprocessor tasks.

The image source position generator relies on the source position and the listener position and, particularly due to the fact that the listener position will change in runtime, the image source position generator will operate in runtime. The same is true for the sound renderer 30 that additionally operates in runtime using the sound source data, the listener position and additionally using the image source positions and the additional image source positions if required, i.e., if the user is placed in an invisible zone that has to be "enlightened" by an additional image source determined by the image source position generator in accordance with the present invention.

Figure 5:
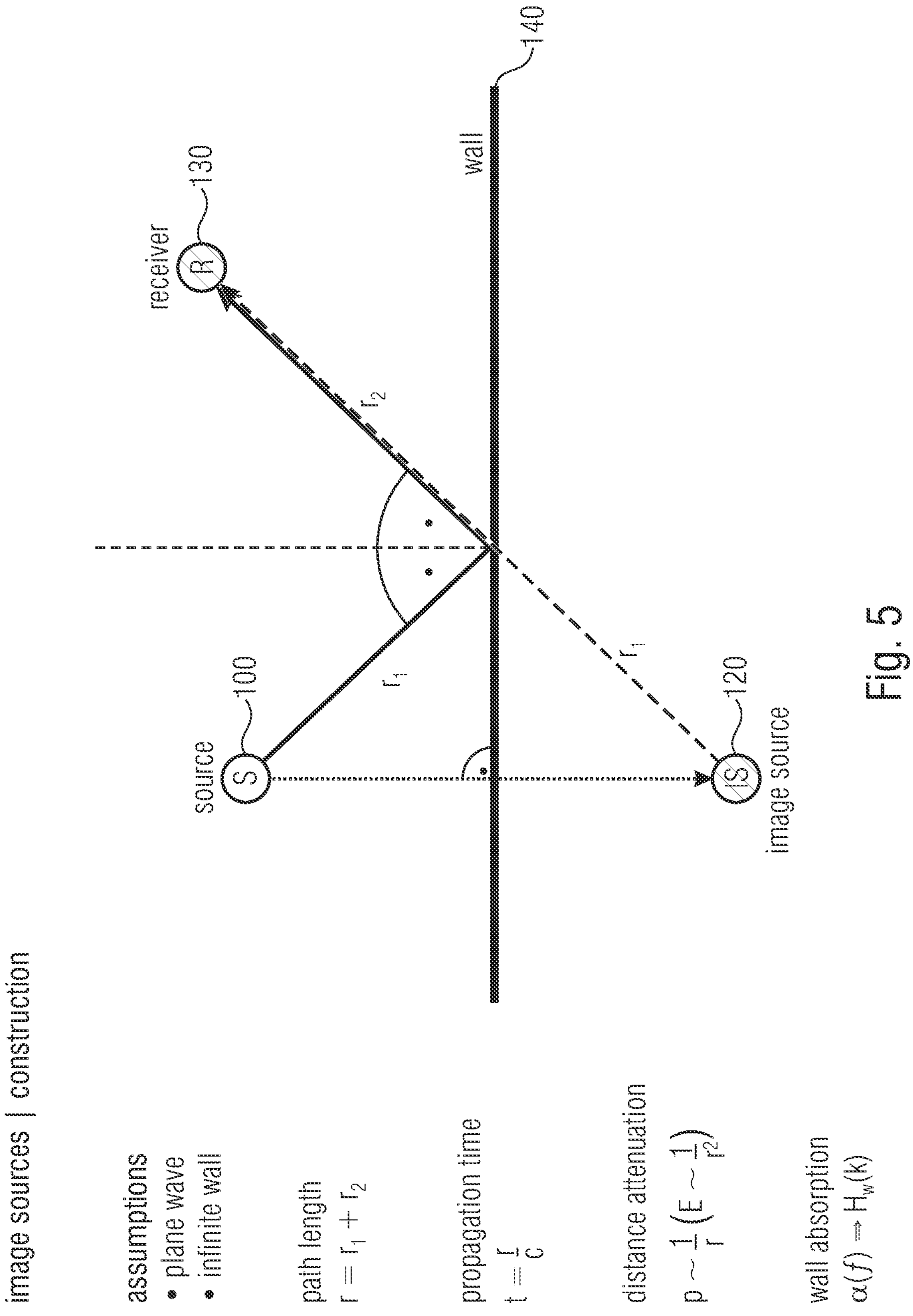
FIG. 5 illustrates the construction of an image source in Geometrical Acoustics.
Figure 6:
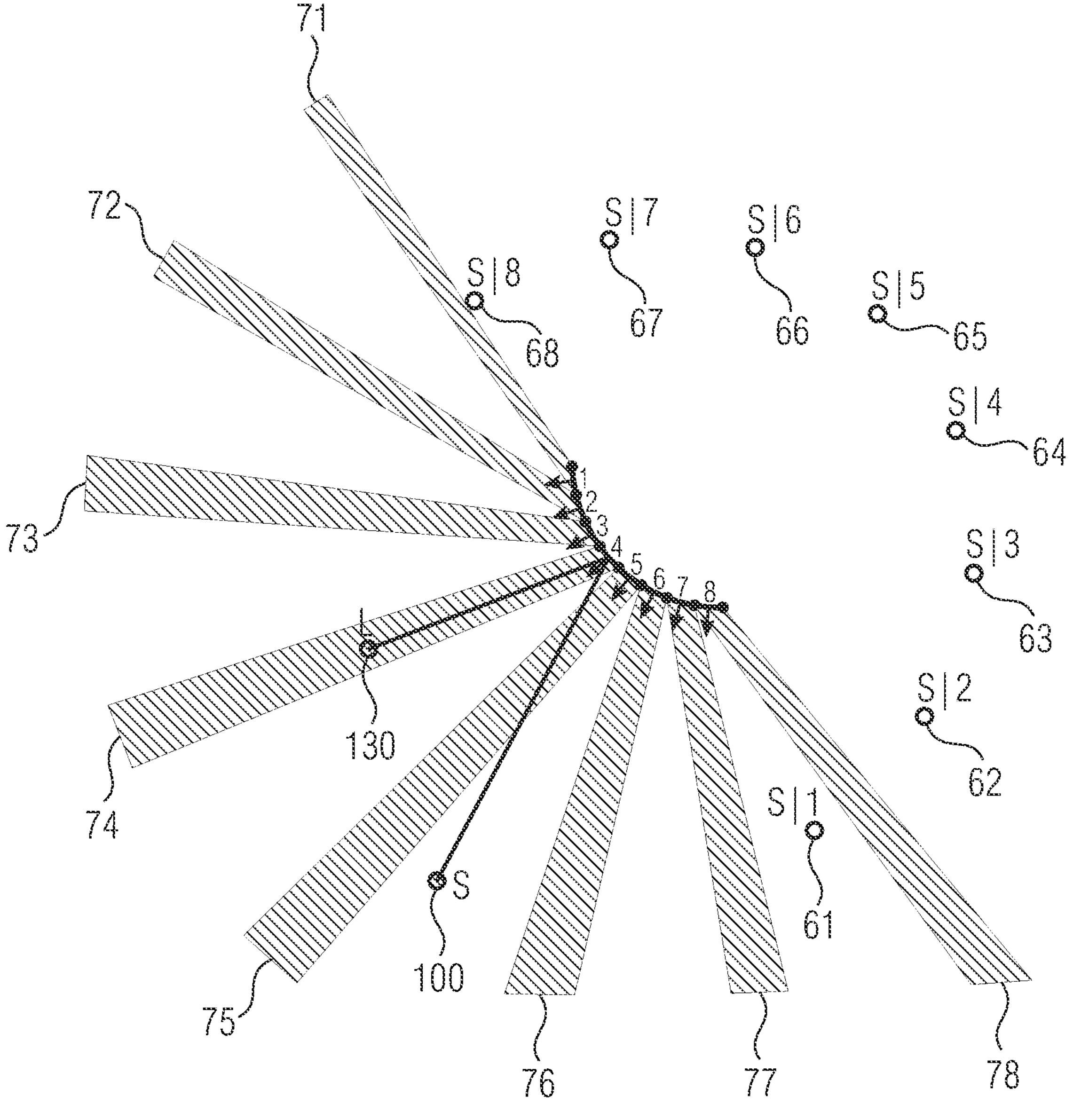
FIG. 6 illustrates a specific object resulting in visible zones and invisible zones.
Figure 7:
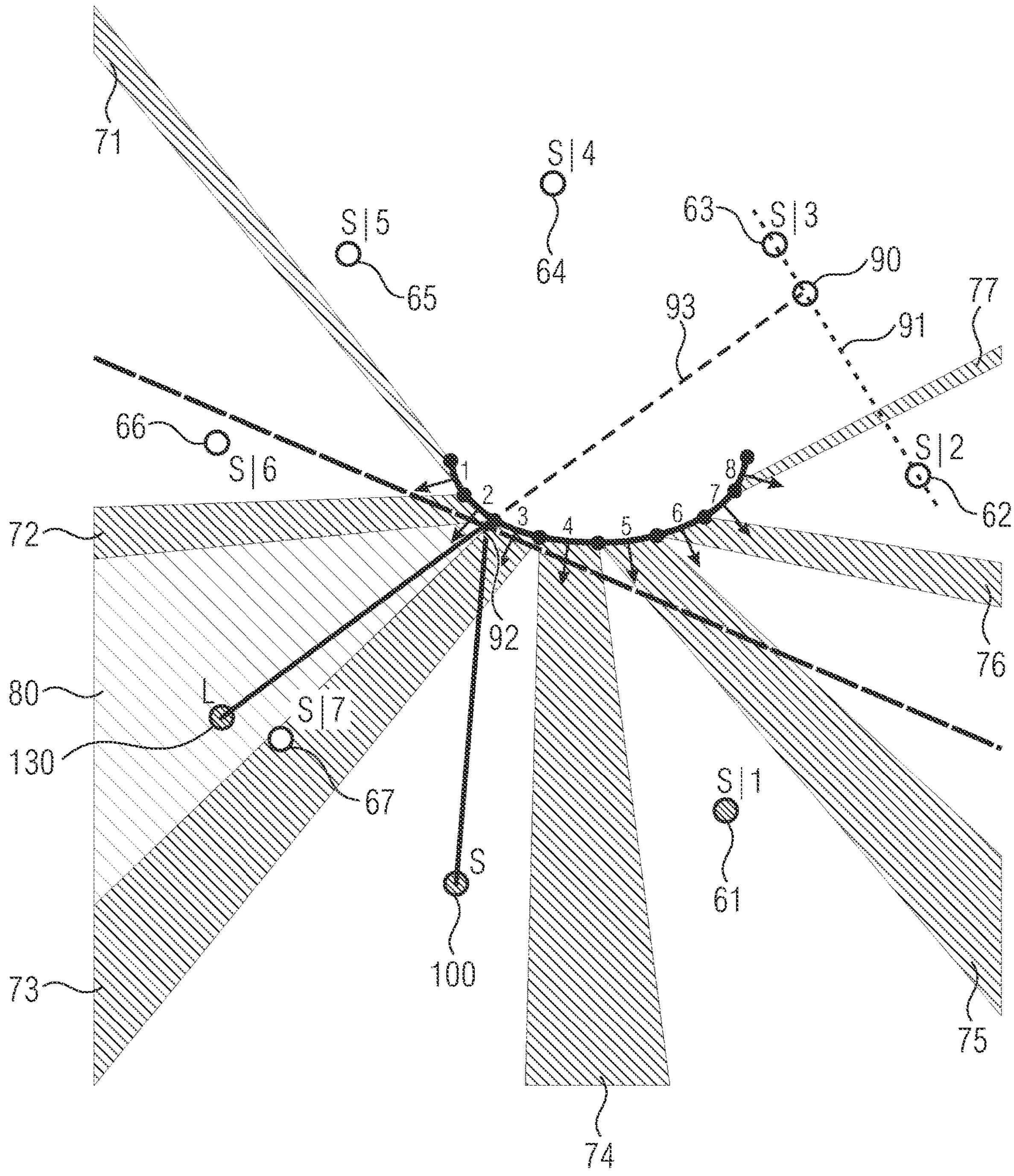
FIG. 7 illustrates a specific reflection object where an additional image source is placed at an additional image source position in order to "enlighten" the invisible zones.

Advantageously, the geometry data provider 10 is configured for providing an analysis of the reflection object of the sound scene to determine a specific reflection object that is represented by a first polygon and a second adjacent polygon. The first polygon has associated a first image source position and the second polygon has associated a second image source position, where these image source positions are constructed, for example, as illustrated in FIG. 5. These image sources are the "classical image sources" that are mirrored at a certain wall. However, the first and second image source positions result in a sequence comprising a first visible zone related to the first image source position, a second visible zone related to the second image source position and an invisible zone placed between the first and the second visible zone as illustrated in FIG. 6 or 7, for example. The image source position generator is configured for generating the additional image source position such that the additional image source located at the additional image source position is placed between the first image source position and the second image source position.

Advantageously, the image source position generator additionally generates the first image source and the second image source in a classical way, i.e., by mirroring, for example, at a certain mirroring wall or, as is the case in FIG. 6 or FIG. 7, when the reflecting wall is small and does not comprise a wall point where the rectangular projection of the source crosses the wall, the corresponding wall is extended only for the purpose of image source construction.

The sound renderer 30 is configured for rendering the sound source at the sound source position in order to obtain the direct sound at the listener position. Additionally, in order to also render a reflection, the sound source is rendered at the first image source position, when the listener position is located within the first visible zone. In this situation, the image source position generator does not need to generate an additional image source position, since the listener position is such that any artefacts due to the disco ball effect do not occur at all. The same is true when the listener position is located within the second visible zone associated with the second image source. However, when the listener is located within the invisible zone, then the sound renderer uses the additional image source position and does not use the first image source position and the second image source position. Instead of the "classical" image sources modeling the reflections at the first and the second adjacent polygons, the sound renderer only renders, for the purpose of reflection rendering, the additional image source position generated in accordance with the present invention in order to fill up or enlighten the invisible zone with sound. Any artefacts that would otherwise result in a permanently switching localization, timbre and loudness are avoided by means of the inventive processing using the image source position generator generating the additional image source between the first and the second image source position.

FIG. 6 illustrates the so-called disco ball effect. Particularly, the reflecting surfaces are sketched in black and are denoted by 1, 2, 3, 4, 5, 6, 7, 8. Each reflecting surface or polygon 1, 2, 3, 4, 5, 6, 7, 8 is also represented by a normal vector indicated in FIG. 6 in a normal direction to the corresponding surface. Furthermore, each reflecting surface has associated a visible zone. The visible zone associated with a source S at a source position 100 and reflecting surface or polygon 1 is indicated at 71. Furthermore, the corresponding visible zones for the other polygons or surfaces 2, 3, 4, 5, 6, 7, 8 are illustrated in FIG. 6 by reference numbers 72, 73, 74, 75, 76, 77, 78, for example. The visible zones are generated in such a way that only within the visible zone associated with a certain polygon, the condition of the incidence angle being equal to the reflection angle of a sound emitted by the sound source S is fulfilled. For example, polygon 1 has a quite small visible zone 71, since the extension of polygon 1 is quite small, and since the angle of incidence being equal to the angle of reflection can only be fulfilled for reflection angles within the small visible zone 71.

Furthermore, FIG. 6 also has a listener L located at a listener position 130. Due to the fact that the listener L is placed within the visible zone 74 associated with polygon number 4, the sound for the listener L is rendered using the image source 64 illustrated at S/4. This image source S/4 indicated at 64 in FIG. 6 is responsible for modeling the reflection at reflecting surface or polygon number 4, and since the listener L is located within the visible zone 74 associated with the image source for the certain wall, no artefacts would occur. However, should there by a movement of the listener in the quite zone between visible zones 73 and 74 or into the invisible zone between visible zones 74 and 75, i.e., when the listener moves upwards or downwards, then a classical renderer would stop rendering using image source S/4, and since the listener is not located in visible zone 73 or visible zone 75 associated with image source S/3 63 or S/565, then the renderer would not render any reflections without the present invention.

In FIG. 6, the disco ball effect is illustrated and the reflecting surfaces are sketched in black, gray areas mark the regions where the n-th image source "Sn" is visible, and S marks the source at the source position, and L marks the listener at the listener position 130. The reflecting object in FIG. 6 being a specific reflection object could, for example, be an advertising pillar or advertising column watched from the above, the sound source, could, for example, be a car located at a certain position fixed relative to the advertising color, and the listener would, for example, be a human walking around the advertising pillar in order to look what is on the advertising pillar. The listening human will typically hear the direct sound from the car, i.e., from position 100 to the human's position 130 and, additionally, will hear the reflection at the advertising pillar.

FIG. 5 illustrates the construction of an image source. Particularly, and with respect to FIG. 6, the situation of FIG. 5 would illustrate the construction of image source S/4. However, the wall or polygon 4 in FIG. 6 does not even reach until the direct connection between the source position 100 and the image source position 64. The wall 140 illustrated in FIG. 5 as being a mirroring plane for the generation of the image source 120, based on the source 100, is not existent in FIG. 6 at the direct connection between the source 100 and the image source 120. However, for the purpose of constructing image sources, a certain wall, such as polygon 4 in FIG. 6, is extended in order to have a mirroring plane for mirroring the source at the wall. Furthermore, in classical image source processing, assumptions are made, in addition to an infinite wall, that the source emits a plane wave. However, this assumption is not material for the present invention, and the same is true for the infinity of the wall, since, for the purpose of mirroring the wall, an infinite wall actually is only required for explaining the underlying mathematical model.

Furthermore, FIG. 5 illustrates the condition of having same angles of incidence on the wall and of the reflection from the wall. Furthermore, the path length for the propagation path from the source to the receiver is maintained. The path length from the source to the receiver is exactly the same as the path length from the image source to the receiver, i.e., $r_1+r_2$, and the propagation time is equal to the quotient between the total path length and the sound velocity c. Furthermore, a distance attenuation of the sound pressure p being proportional to 1/r or a distance attenuation of the sound energy being proportional to $1/r^2$ is typically modeled by the renderer rendering the image source.

Furthermore, a wall absorption/reflection behavior is modeled by means of the wall absorption or reflection coefficient $\alpha$. Advantageously, the coefficient $\alpha$ is dependent on the frequency, i.e., represents a frequency-selective absorption or reflection curve $H_w(k)$ and typically has a high-pass characteristic, i.e., high frequencies are better reflected than low frequencies. This behavior is accounted for in embodiments. The strength of the image source application is that subsequent to the construction of the image source and the description of the image source with respect to the propagation time, the distance attenuation and the wall absorption, the wall 140 will be completely removed from the sound scene and is only modeled by the image source 120.

FIG. 7 illustrates a problematic situation, where the first polygon 2 having associated the first image source position S/2 62 and the second polygon 3 having associated therewith the second image source position 63 or S/3 are placed with a short angle in between, and the listener 130 is placed in the invisible zone between the first visible zone 72 associated with the first image source 62 and the second visible zone 73 associated with the second image source S/3 63. In order to "enlighten" the invisible zone 80 illustrated in FIG. 7, an additional image source position 90 being placed between the first image source position 62 and the second image source position 63 is generated. Instead of modeling the reflection by means of the image source 63 or the image source 62 that is constructed as illustrated in FIG. 5 for the classical procedure, the reflection is now modeled using the additional image source position 90 that advantageously has the same distance to the reflection point at least in a certain tolerance.

For the additional image source position 90, the same path length, propagation time, distance attenuation and wall absorption is used for the purpose of rendering the first order reflection in the invisible zone 80. In an embodiment, a reflection point 92 is determined. The reflection point 92 is at the junction between the first polygon and the second polygon when watched from above, and typically is in a vertical position, for example in the example of the advertising pillar that is determined by the height of the listener 130 and the height of the source 100. Advantageously, the additional image source position 90 is placed on a line connecting the listener 130 and the reflection point 92, where this line is indicated at 93. Furthermore, the exact position of the additional sound source 90 in the embodiment is at the intersection point of the line 93 and the connecting line 91, connecting the image source positions 62 and 63 that have visible zones adjacent to the invisible zone 80.

However, the FIG. 7 embodiment only illustrates a most embodiment, where the path of the additional image source position is exactly calculated. Furthermore, the specific position of the additional sound source position on the connecting line 92, depending on the listener position 130, is also calculated exactly. When the listener L is closer to the visible zone 73, then the sound source 90 is closer to the classical image source position 63 and vice versa. However, locating the additional sound source position in any place between the image sound sources 62 and 63 will already improve the entire audible impression very much compared to simply suffering from the invisible zones. Although FIG. 7 illustrates the embodiment with an exact position of the additional sound source position, another procedure would be to locate the additional sound source at any place between the adjacent sound source positions 62 and 63 so that a reflection is rendered in the invisible zone 80.

Furthermore, although it is advantageous to exactly calculate the propagation time depending on the exact path length, other embodiments rely on an estimation of the path length as depending on a modified path length of image source position 63, or a modified path length of the other adjacent image source position 62. Furthermore, with respect to the wall absorption or wall reflection modeling, for the purpose of rendering the additional sound source position 90, either the wall absorption of one of the adjacent polygons can be used, or an average value of both absorption coefficients if they are different from each other can be used, and even a weighted average can be applied depending on whether the listener is closer to which visible zone, so that a certain wall absorption data of the wall having the visible zone to which the user is located closer receives a higher weighting value in a weighted addition compared to the absorption/reflection data of the other adjacent wall having the visible zone being further away from the listener position.

Figure 2:
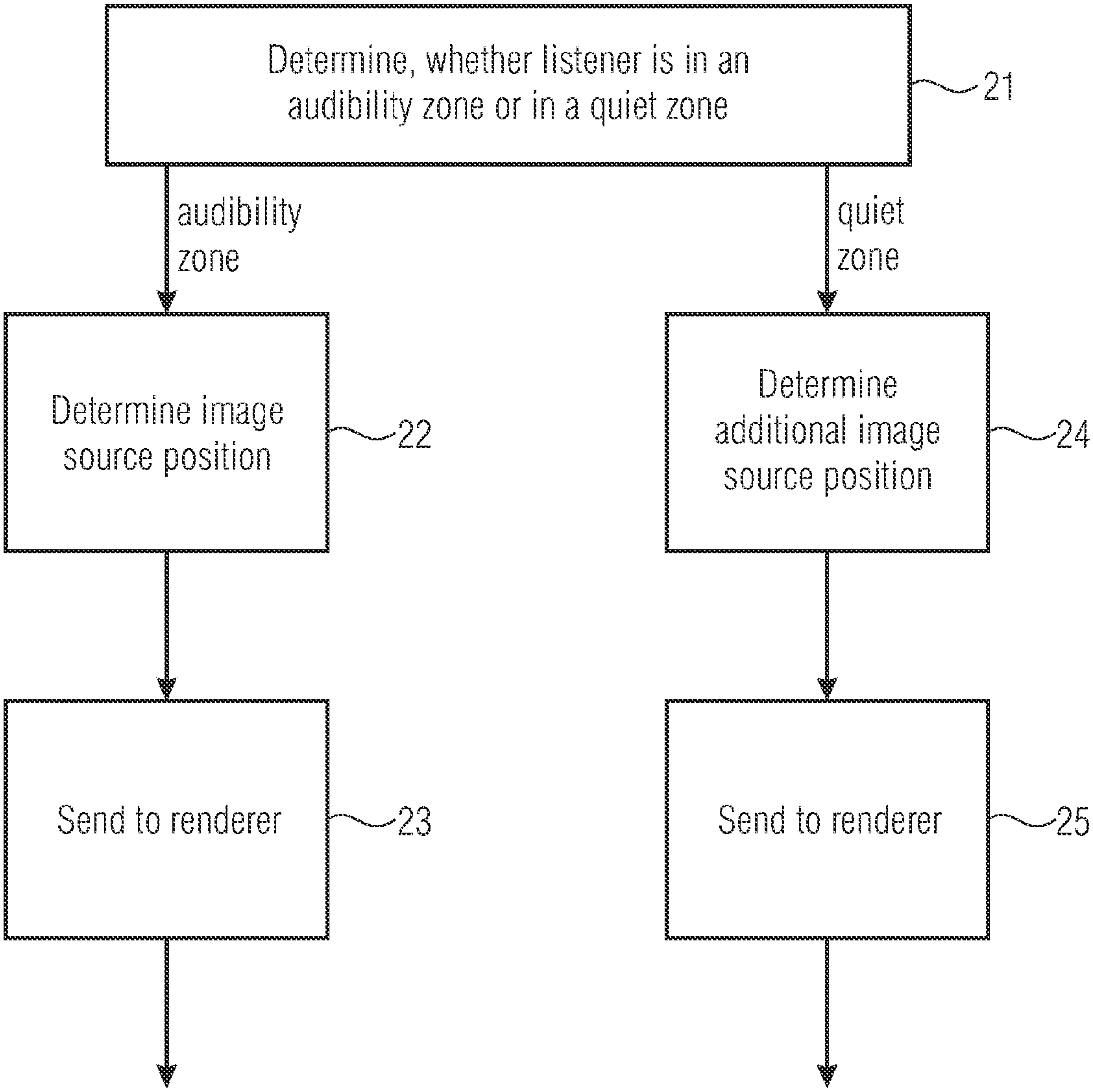
FIG. 2 illustrates the flowchart for the implementation of the image source position generator in an embodiment.

FIG. 2 illustrates an implementation of the procedure of the image source position generator 20 of FIG. 1. In a step 21, it is determined, whether the listener is in an visible zone such as 72 and 73 of FIG. 7 or in an invisible zone 80. In case it is determined that the user is in the visible zone, the image source position such as S/2 62 when the user is in zone 72 or the image source position 63 or S/3 if the user is in the visible zone 73 is determined. Then, the information on the image source position is sent to the renderer 30 of FIG. 1 as is illustrated in step 23.

Alternatively, when step 21 determines that the user is placed within the invisible zone 80, the additional image source position 90 of FIG. 7 is determined and as soon as same is determined as illustrated in step 24, this information on the additional image source position and if applicable, other attributes such as a path length, a propagation time, a distance attenuation or a wall absorption/reflection information as also sent to the renderer as illustrated in step 25.

Figure 3:
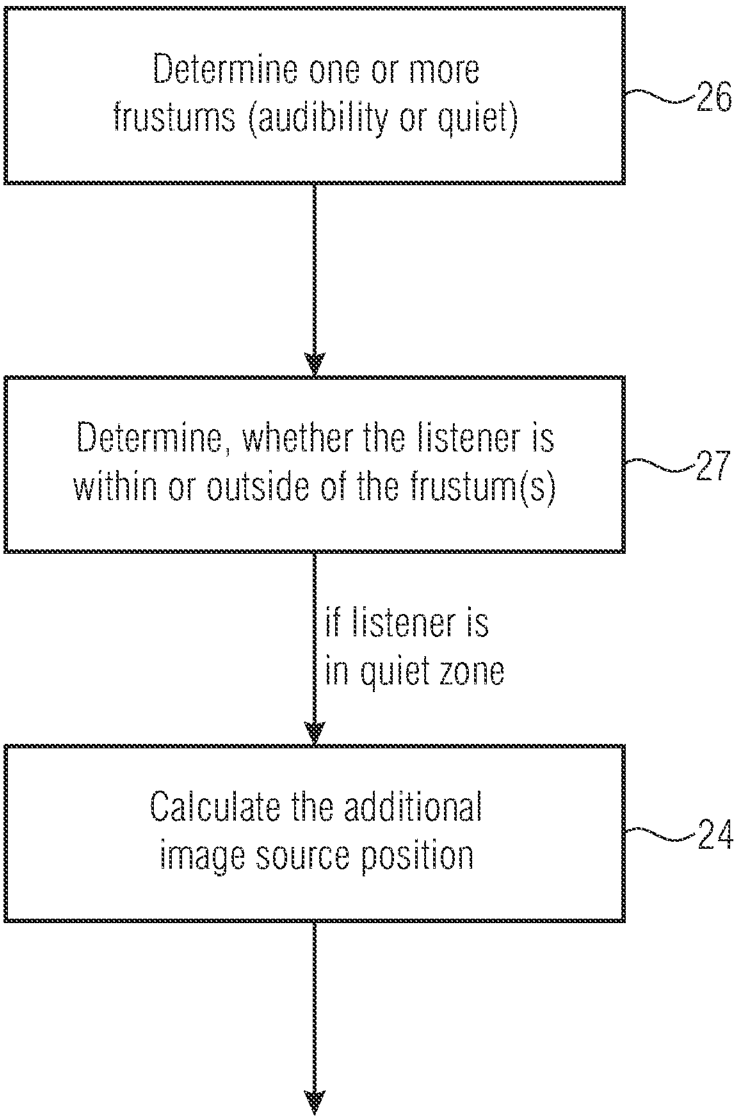
FIG. 3 illustrates a further implementation of the image source position generator.

FIG. 3 illustrates an implementation of step 21, i.e., how in a specific embodiment, it is determined whether the listener is in an visible zone or in an invisible zone. To this end, two basic procedures are envisioned. In one basic procedure, the two neighboring visible zones 72 and 73 are calculated as frustums based on the source position 100 and the corresponding polygon and, then it is determined, whether the listener is in one of those visible frustums. When it is determined that the listener is not located within one of the frustums, as it is indicated in step 26, then a conclusion is made that the user is in the invisible zone. Alternatively, instead of calculating two frustums describing the visible zones 72 and 73 of FIG. 7, another procedure is to actually determine the invisible frustum describing the invisible zone 80, and if the invisible frustum is determined, then it is decided that the listener is within the invisible zone 80, when the listener is placed within the quit frustum. When it is determined that the listener is in the invisible zone as is the result of step 27 and step 26 of FIG. 3, then the additional image source position is calculated as illustrated in step 24 of FIG. 2 or step 24 of FIG. 3.

Figure 4:
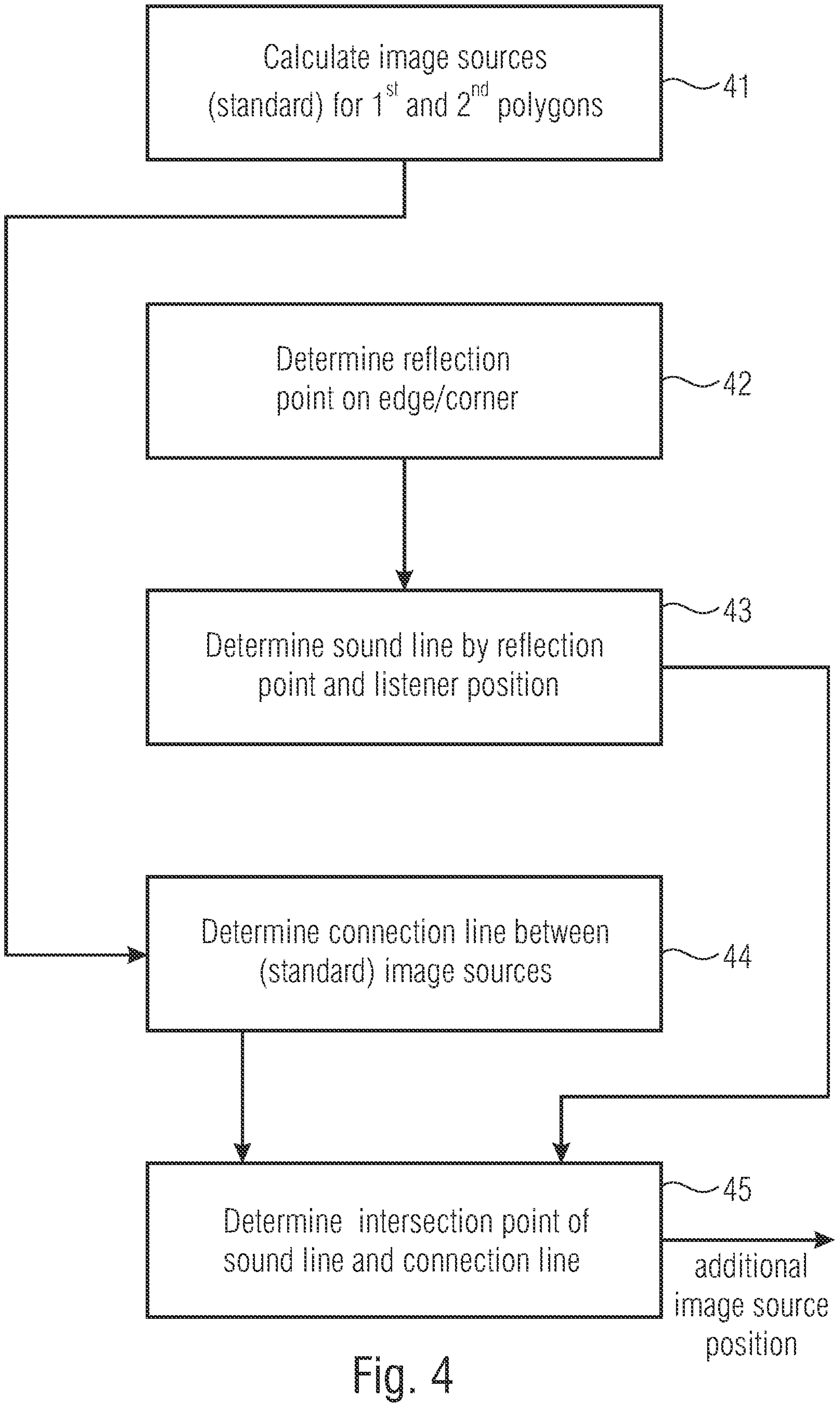
FIG. 4 illustrates another implementation of the image source position generator.

FIG. 4 illustrates an implementation of the image source position generator for calculating the additional image source position 90 in an embodiment. In a step 41, the image source positions for the first and the second polygons, i.e., image source position 62 and 63 of FIG. 7 are calculated in a classical or standard procedure. Furthermore, as illustrated in step 42, a reflection point on the edge or corner as has been determined by the geometric data provider 10 as being a "rounded" edge or corner is determined. The determination of the reflection point 92 in FIG. 7, for example, is on the crossing line between the two polygons 2 and 3 and, in case of an exact rendering also in the vertical dimension, the vertical dimension of the reflection point is determined in step 42 depending on the height of the listener and the height of the source and other attributes such as the distance of the listener and the distance of the source from the reflection point or line 92. Furthermore, as illustrated in block 43, a sound line is determined by connecting the listener position 130 and the reflection point 92 and by extrapolating this line further into the region where the image source positions are located and have been determined in block 41. This sound line is illustrated by reference number 93 in FIG. 7. In step 44, a connection line between the standard image sources as determined by block 41 is calculated, and then, as illustrated in block 45, the intersection of the sound line 93 and the connection line 91 is determined to be the additional sound source position. It is to be noted that the order of steps as indicated in FIG. 4 is not compulsory. Since the result of a step 41 is only required before the step 44, the steps 42 and 43 can already be calculated before calculating step 41 and so on. The only requirement is that, for example, the step 42 has to be performed before step 43 so that the sound line, for example, can be established.

Subsequently, further procedures are given in order to illustrate a further procedure of calculating the additional image source position. The extended image source model needs to extrapolate the image source position in the "dark zone" of the reflectors, i.e. the areas between the "bright zones" in which the image source is visible (see FIG. 1). In a first embodiment of this method, a frustum is created for each round edge and it is checked, if the listener is located within this frustum. The frustum is created as follows: For the two adjacent planes of the edge, namely the left and the right plane, one computes the image sources $S_L$ and $S_R$ by mirroring the source on the left and the right plane. From these points together with the beginning and the end point of the edge one can define four planes $k \in [1,4]$ in Hesse-Normal form where the normal vectors $\vec{N}_k$ are pointing inside of the frustum, $$\vec{N}_k \vec{X} - d_k = 0. \quad (1)$$

Figure 12:
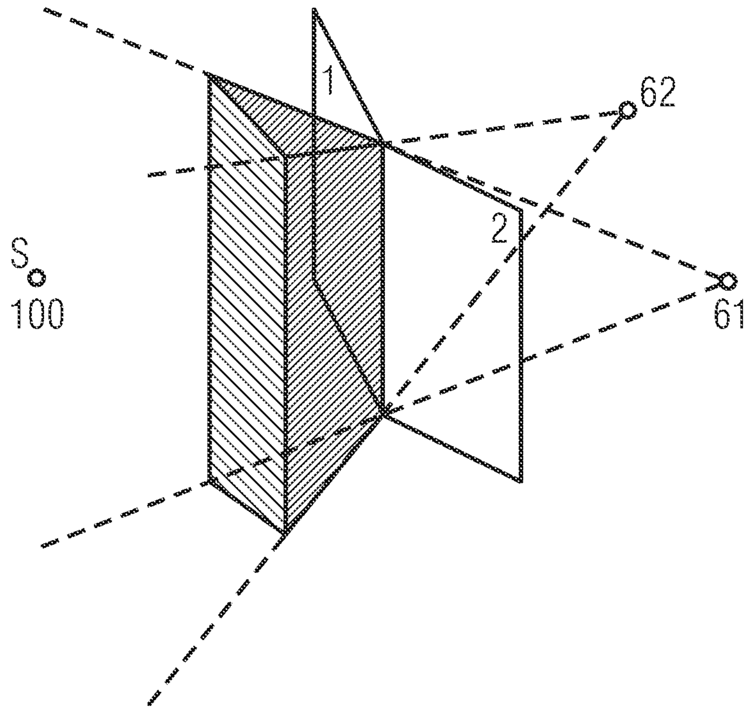
FIG. 12 illustrates the quiet zone or quiet frustum of related to a rounded edge of e.g.

If the distance $$l_k = \vec{N}_k \vec{L} - d_k \quad (2)$$

is greater than or equal zero for all 4 planes, then the listener is located within the frustum that defines the coverage area of the model for the given round edge. The invisible zone frustum is illustrated in FIG. 12 additionally showing the source position 100 and the image sources 61 and 62 belonging to the respective polygons 1 and 2. The frustum starts on the edge between polygons 1 and 2 and opens towards the source position out from the drawing plane and into the drawing plane.

In this case, one can determine the reflection point on the round edge as follows:

Let $\vec{P}_S$ be the orthogonal projection of the source position $\vec{S}$ onto the edge and $\vec{P}_L$ be the orthogonal projection of the listener position $\vec{L}$ onto the edge. This yields the reflection point $\vec{R}$ as follows:

$$d_S = |\vec{P}_S - \vec{S}| \quad (3)$$

$$d_L = |\vec{P}_L - \vec{L}| \quad (4)$$

$$\vec{R} = \frac{d_S}{d_S + d_L} \vec{P_L} + \frac{d_L}{d_S + d_L} \vec{P_S} \quad (5)$$

Figure 10:
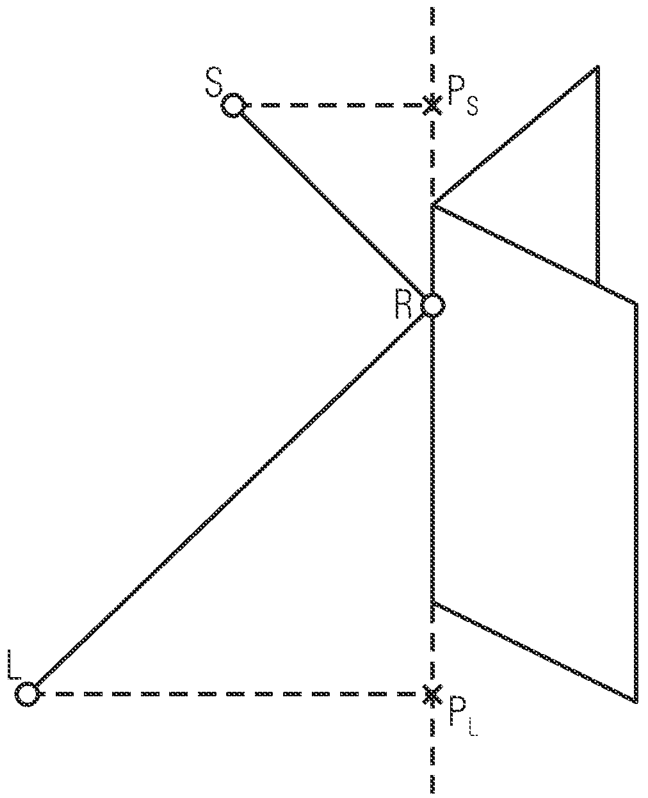
FIG. 10 illustrates the construction of the reflection point R on an edge.

The construction of the reflection point is illustrate in FIG. 10 showing the listener position L, the source position S, the projections Ps and Pl and the resulting reflection point, The computation of the coverage area of the round corners is very similar. Here, the k adjacent planes yield k image sources which together with the corner position result in a frustum that is bounded by k planes. Again, if the distances of the listener to these planes are all greater than or equal zero, the listener is located within the coverage area of the round corner. The reflection point $\vec{R}$ is given by the corner point itself.

Figure 11:
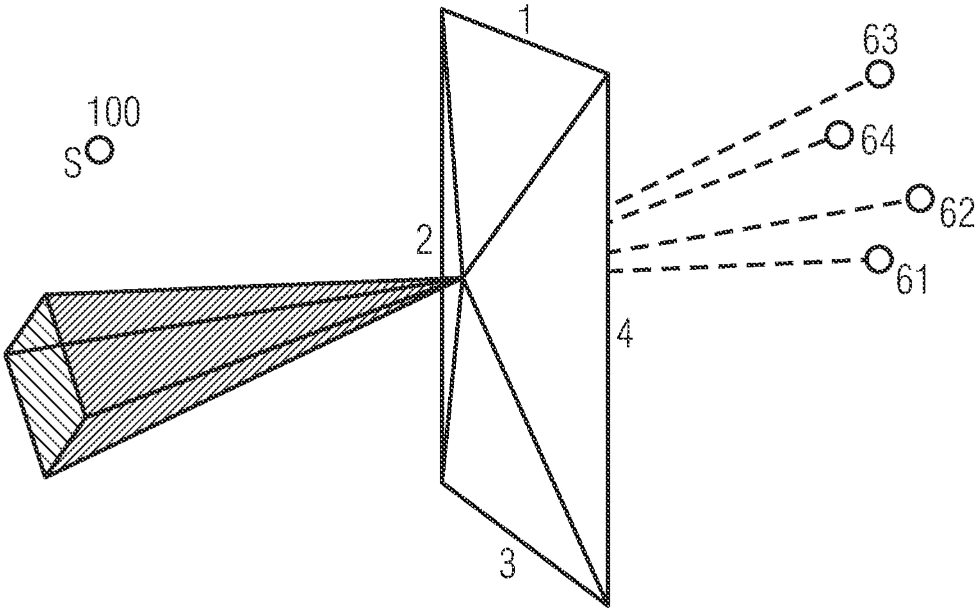
FIG. 11 illustrates the quiet zone related to a rounded corner.

This situation, i.e., the invisible frustum or a round corner is illustrated in FIG. 11 illustrating four image sources 61, 62, 63, 64 belonging to the four polygons or planes 1, 2, 3, 4. In FIG. 11, the source is located in a visible zone and not in the invisible zone starting with its tip at the corner and opening away from the four polygons.

For higher-order reflections, one can extend this method according to the frustum-tracing method where one splits up each frustum into sub-frustums whenever one hits a surface, round edge, or round corner.

Figure 8:
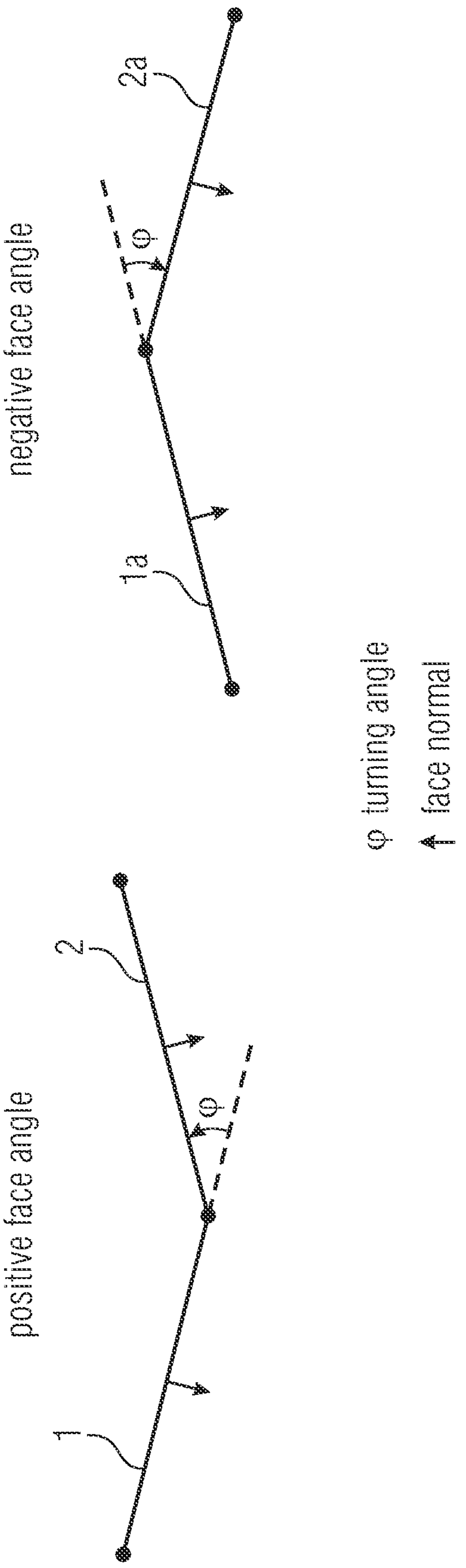
FIG. 8 illustrates a procedure applied by the geometry data provider.

FIG. 8 illustrates a further implementation of the geometric data provider. Advantageously, the geometric data provider operates as a true data provider that generates, during runtime, pre-stored data on objects in order to indicate that an object is a specific reflection object having a sequence of visible zones and an invisible zone in between. The geometric data provider can be implemented as using a geometry pre-processor that is executed once during initialization, as it does not depend on the listener or source positions. Contrary thereto, the extended image source model as applied by the image source position generator is executed at run-time and determines edge and corner reflections depending on the listener and source positions.

The geometric data provider may apply a curved surface detection. The geometry data provider also termed to be the geometry-processor calculates the specific reflection object determination in advance, in an initialization procedure or a runtime. If, for example, a CAD software is used to export the geometry data, as much information about curvatures as possible is advantageously used by the geometry data provider. For example, if surfaces are constructed from round geometry primitives like spheres or cylinders or from spline interpolations, the geometry pre-processor/geometry data provider is advantageously implemented within the export routine of the CAD software and detects and uses the information from the CAD software.

If no a priori knowledge about the surface curvature is available, the geometry preprocessor or data provider needs to implement a round edge and round corner detector by using only the triangle or polygon mesh. For example, this can be done by computing the angle $\phi$ between two adjacent triangles 1, 2 or 1$a$, 2$a$ as illustrated in FIG. 8. Particularly, the angle is determined to be a “face angle” in FIG. 8, where the left portion of FIG. 8 illustrates a positive face angle and the right portion in FIG. 8 illustrates a negative face angle. Furthermore, the small arrows illustrate the face normal in FIG. 8. If the face angle is below a certain threshold, the adjacent edge in both adjacent polygons forming the edge are considered to represent a curved surface section and is marked as such. If all edges that are in connection to a corner are marked as being round, the corner is also marked as being round, and as soon as this corner becomes pertinent for the sound rendering, the functionality of the image source position generator for generating the additional image source position is activated. When, however, it is determined that a certain reflection object is not a specific reflection object but a straight forward object, where any artifacts are not expected or are even intended by a sound scene creator, the image source position generator is only used for determining the classical image source positions, but any determination of an additional image source position in accordance with the present invention is deactivated for such a reflection object.

Figure 9:
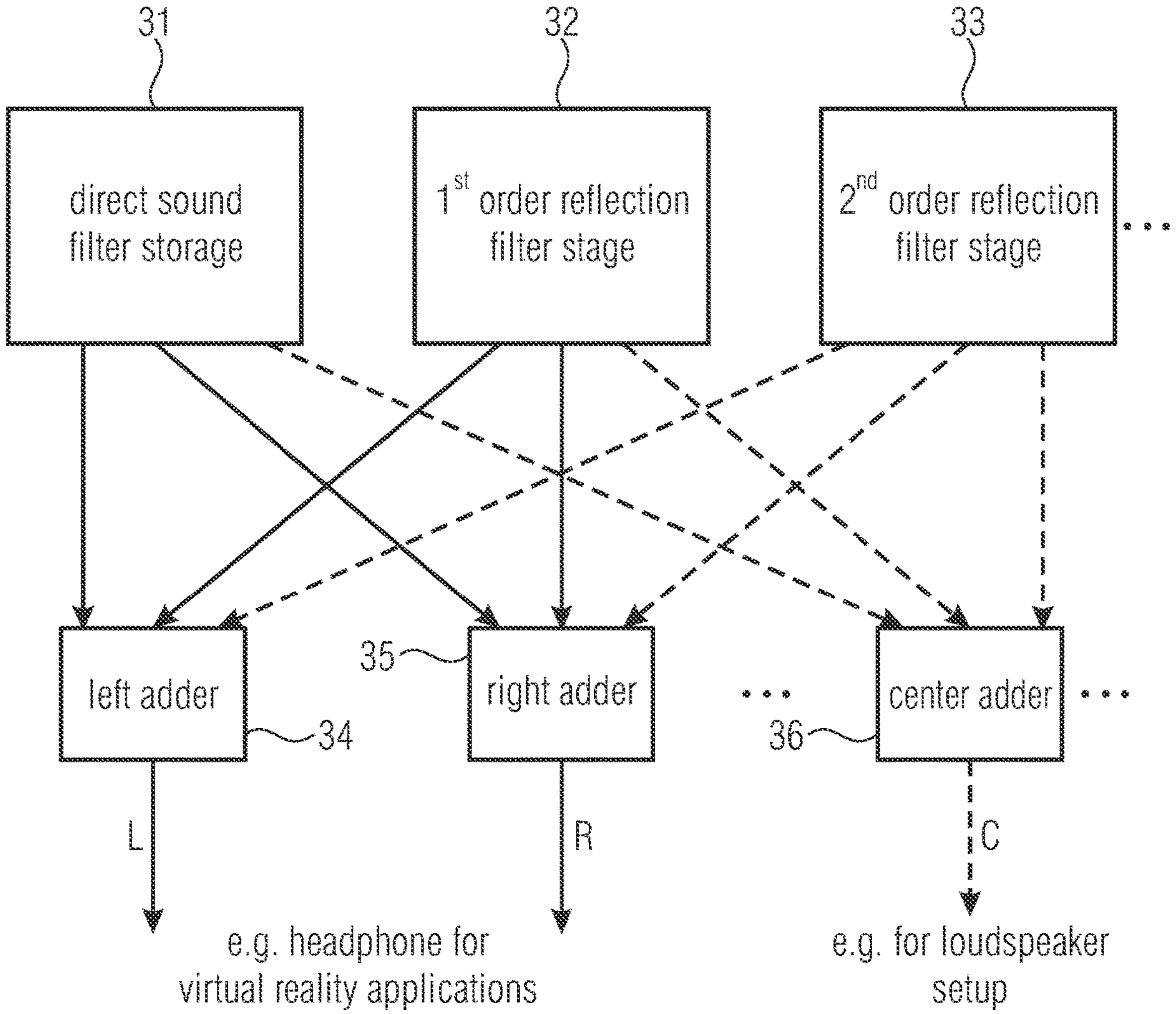
FIG. 9 illustrates an implementation of the sound renderer for rendering the sound source at the sound source position and for additionally rendering the sound source at an image source position or an additional image source position depending on the position of the listener.

FIG. 9 illustrates an embodiment of the sound renderer 30 of FIG. 1. The sound renderer 30 advantageously comprises a direct sound filter stage 31, the first order reflection filter stage 32 and, optionally, a second order reflection filter stage and probably one or more higher order reflection filter stages as well.

Furthermore, depending on the output format required by the sound renderer 30, i.e., depending on whether the sound renderer outputs via headphones, via loudspeakers or just for storage or transmission in a certain format, a certain number of output adders such as a left adder 34, a right adder 35 and a center adder 36 and probably other adders for left surround output channels, or for right surround output channels, etc. are provided. While the left and the right adders 34 and 35 are advantageously used for the purpose of headphone reproduction for virtual reality applications, for example, any other adders for the purpose of loudspeaker output in a certain output format can also be used. When, for example, an output via headphones is required, then the direct sound filter stage 31 applies head related transfer functions depending on the sound source position 100 and the listener position 130. For the purpose of the first order reflection filter stage, corresponding head related transfer functions are applied, but now for the listener position 130 on the one hand and the additional sound source position 90 on the other hand. Furthermore, any specific propagation delays, path attenuations or reflection effects are also included within the head related transfer functions in the first order reflection filter stage 32. For the purpose of higher order reflection filter stages, other additional sound sources are applied as well.

If the output is intended for a loudspeaker set up, then the direct sound filter stage will apply other filters different from head related transfer functions such as filters that perform vector based amplitude panning, for example. In any case, each of the direct sound filter stage 31, the first order reflection filter stage 32 and the second order reflection filter stage 33 calculates a component for each of the adder stages 34, 35, 36 as illustrated, and the left adder 34 then calculates the output signal for the left headphone speaker and the right adder 35 calculates the headphone signal for the right headphone speaker, and so on. In case of an output format that is different from a headphone, the left adder 34 may deliver the output signal for the left speaker and the right adder 35 may deliver the output for the right speaker. If only two speakers in a two-speaker environment are there, then the center adder 32 is not required.

The inventive method avoids the disco-ball effect, that occurs when a curved surface, approximated by a discrete triangle mesh, is auralized using the classical image sound source technique [3, 4]. The novel technique avoids invisible zones, making the reflection audible. For this procedure, approximations of curved surfaces have to be identified by threshold face angle. The novel technique is an extension to the original model, with special treatment faces identified as a representation of a curvature.

Classical image sound source techniques [3, 4] do not consider that the given geometry can (partially) approximate a curved surface. This causes dark zones (silence) to be casted away from edge points of adjacent faces (see FIG. 1). A listener moving along such a surface observes reflections to be switched on/off depending where he/she is located (enlighted/invisible zone). This causes unpleasant audible artifacts, also diminishing the degree of realism and thus the immersion. In essence, classical image source techniques fail to realistically render such scenes.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Vorländer, M. "Auralization: fundamentals of acoustics, modelling, simulation, algorithms and acoustic virtual reality." *Springer Science & Business Media,* 2007.

[2] Savioja, L., and Svensson, U. P. "Overview of geometrical room acoustic modeling techniques." *The Journal of the Acoustical Society of America* 138.2 (2015): 708-730.

[3] Krokstad, A., Strom, S., and Sørsdal, S. "Calculating the acoustical room response by the use of a ray tracing technique." *Journal of Sound and Vibration* 8.1 (1968): 118-125.

[4] Allen, J. B., and Berkley, D. A. "Image method for efficiently simulating small room acoustics." *The Journal of the Acoustical Society of America* 65.4 (1979): 943-950.

[5] Borish, J. "Extension of the image model to arbitrary polyhedra." *The Journal of the Acoustical Society of America* 75.6 (1984): 1827-1836.

The invention claimed is:

1. Apparatus for rendering a sound scene comprising reflection objects and a sound source at a sound source position, comprising:

a geometry data provider for providing an analysis of the reflection objects of the sound scene to determine a reflection object represented by a first polygon and a second adjacent polygon having associated a first image source position for the first polygon and a second image source position for the second polygon, wherein the first and second image source positions result in a sequence comprising a first visible zone related to the first image source position, an invisible zone and a second visible zone related to the second image source position;

an image source position generator for generating an additional image source position such that the additional image source position is placed between the first image source position and the second image source position; and a sound renderer for rendering the sound source at the sound source position and, additionally for rendering the sound source at the first image source position, when a listener position is located within the first visible zone, for rendering the sound source at the additional image source position, when the listener position is located within the invisible zone, or for rendering the sound source at the second image source position, when the listener position is located within the second visible zone.

2. Apparatus of claim 1, wherein the geometry data provider is configured to retrieve pre-stored information on the reflection objects stored during an initialization stage, and wherein the image source position generator is configured to generate the additional image source position in response to the pre-stored information indicating the reflection object.

3. Apparatus of claim 1, wherein the geometry data provider is configured to detect, during runtime or during an initialization stage and using geometry data on the sound scene delivered by a computer added design application, the reflection object.

4. Apparatus of claim 1, wherein the geometry data provider is configured to detect, during runtime or during an initialization stage, as the reflection object, an object comprising a round geometry, a curved geometry, or a geometry derived from a spline interpolation.

5. Apparatus of claim 1, wherein the geometry data provider is configured to compute an angle between two adjacent polygons of a reflection object and to mark the two adjacent polygons as a specific pair of polygons, when the angle is below a threshold, to compute a further angle between two further adjacent polygons of the reflection object and to mark the two further adjacent polygons as a further specific pair of polygons, when the further angles below the threshold, and to detect the reflection object, when the further adjacent polygons and the adjacent polygons have an edge in common, or belong to the same corner.

6. Apparatus of claim 1, wherein the image source position generator is configured to analyze, whether the listener position is in the invisible zone, and to generate the additional image source position only when the listener position is located in the invisible zone.

7. Apparatus of claim 6, wherein the image source position generator is configured to determine a first geometrical range associated with the first polygon or a second geometrical range associated with the second polygon, or a third geometrical range between the first geometrical range and the second geometrical range, wherein the first geometrical range determines the first visible zone or wherein the second geometrical range determines the second visible zone, or wherein the third geometrical range determines the invisible zone, and wherein the first or the second geometrical range is determined such that a condition that an incidence angle from the source position to the first or the second polygon is equal to a reflection angle from the first or the second polygon is fulfilled for a position in the first or the second geometrical zone, or wherein the third geometrical range is determined such that the condition of a reflection angle being equal to the incidence angle is not fulfilled for a position in the invisible zone.

8. Apparatus of claim 6, wherein the image source position generator is configured to calculate a first frustum for the first polygon and to determine, whether the listener position is located within the first frustum, or wherein the image source position generator is configured to calculate a second frustum for the second polygon and to determine, whether the listener position is located within the second frustum, or wherein the image source position generator is configured to calculate an invisible zone frustum and to determine, whether the listener is located within the invisible zone frustum.

9. Apparatus of claim 8, wherein the image source position generator is configured to define four planes having normal vectors pointing inside the first frustum, the second frustum or the invisible zone frustum, and wherein the image source position generator is configured to determine, whether a distance of the listener position to each plane is greater than or equal to 0, and to detect that the listener is located within a frustum of the first frustum, the second frustum or the invisible zone frustum, when the distance of the listener to each plane is greater than or equal to 0.

10. Apparatus of claim 1, wherein the image source position generator is configured to calculate the additional image source position as a position between the first image source position and the second image source position.

11. Apparatus of claim 10, wherein the image source position generator is configured to calculate the additional image source position on a connection line between the first image source position and the second image source position.

12. Apparatus of claim 10, wherein the image source position generator is configured to calculate the additional image source position as a position on a circular arc with radius r1 around reflection point, where r1 denotes the distance between the source position and the reflection point.

13. Apparatus of claim 10, wherein the image source position generator is configured to calculate the additional image source position, so that a distance between the additional image source position and the second image source position is proportional to a distance of the listener position to the second visible zone, or so that a distance between the additional image source position and the first image source position is proportional to a distance of the listener position to the first visible zone.

14. Apparatus of claim 11, wherein the image source position generator is configured to determine a reflection point using an orthogonal projection of the vector for the sound source position and an orthogonal projection of the vector for the listener position with respect to the first polygon or the second polygon or the adjacent edge between the first polygon and the second polygon or to determine a point where the first polygon and the second polygon are connected to each other as the reflection point and, wherein the image source position generator is configured to determine a section point of a line connecting the listener position and the reflection point and the connection line between the first image source position and the second image source position as the additional image source position.

15. Apparatus of claim 1, wherein the image source position generator is configured to calculate the first image source position by mirroring the sound source position at a plane defined by the first polygon, or wherein the image source position generator is configured to calculate the second image source position by mirroring the sound source position at a plane defined by the second polygon.

16. Apparatus of claim 1, wherein the sound renderer is configured to render the sound source so that a sound source signal is filtered using a rendering filter defined by at least one of a distance between a corresponding image sound source position to the listener position and a delay time incurred by the distance, and an absorption coefficient or a reflection coefficient associated with the first polygon or the second polygon, or a frequency-selective absorption or reflection characteristic associated with the first polygon or the second polygon.

17. Apparatus of claim 1, wherein the sound renderer is configured to render the sound source using the sound source signal and the sound source position and the listener position using a direct sound filter stage, and to render the sound source using the sound source signal and a corresponding additional sound source position and the listener position as a first order reflection in a first order reflection filter stage, wherein the corresponding image sound source position comprises the first image sound source position, or the second image sound source position or the additional image sound source position.

18. Method of rendering a sound scene comprising reflection objects and a sound source at a sound source position, comprising:

providing an analysis of the reflection objects of the sound scene to determine a reflection object represented by a first polygon and a second adjacent polygon having associated a first image source position for the first polygon and a second image source position for the second polygon, wherein the first and second image source positions result in a sequence comprising a first visible zone related to the first image source position, an invisible zone and a second visible zone related to the second image source position;

generating an additional image source position such that the additional image source position is placed between the first image source position and the second image source position; and rendering the sound source at the sound source position and, additionally rendering the sound source at the first image source position, when a listener position is located within the first visible zone, rendering the sound source at the additional image source position, when the listener position is located within the invisible zone, or rendering the sound source at the second image source position, when the listener position is located within the second visible zone.

19. Non-transitory digital storage medium having a computer program stored thereon to perform the method of rendering a sound scene comprising reflection objects and a sound source at a sound source position, comprising:

providing an analysis of the reflection objects of the sound scene to determine a reflection object represented by a first polygon and a second adjacent polygon having associated a first image source position for the first polygon and a second image source position for the second polygon, wherein the first and second image source positions result in a sequence comprising a first visible zone related to the first image source position, an invisible zone and a second visible zone related to the second image source position;

generating an additional image source position such that the additional image source position is placed between the first image source position and the second image source position; and rendering the sound source at the sound source position and, additionally rendering the sound source at the first image source position, when a listener position is located within the first visible zone, rendering the sound source at the additional image source position, when the listener position is located within the invisible zone, or rendering the sound source at the second image source position, when the listener position is located within the second visible zone, when said computer program is run by a computer.

* * * * *